United States Patent
Adjakple et al.

(10) Patent No.: US 7,583,653 B2
(45) Date of Patent: Sep. 1, 2009

(54) METHOD FOR DOWNLINK TRANSMISSION SYNCHRONIZATION AND DATA BUFFER SIZING IN A RADIO ACCESS NETWORK

(75) Inventors: Pascal Adjakple, Great Neck, NY (US); Renuka Racha, Ronkonkoma, NY (US); Carl Wang, Flushing, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 638 days.

(21) Appl. No.: 10/877,310

(22) Filed: Jun. 25, 2004

(65) Prior Publication Data
US 2005/0025194 A1   Feb. 3, 2005

Related U.S. Application Data

(60) Provisional application No. 60/482,300, filed on Jun. 25, 2003.

(51) Int. Cl.
*H04J 3/06* (2006.01)
(52) U.S. Cl. ............................... 370/350; 370/509
(58) Field of Classification Search ............... 370/331, 370/335, 350, 509
See application file for complete search history.

(56) References Cited

U.S. PATENT DOCUMENTS

| 6,243,369 | B1 | 6/2001 | Grimwood et al. |
| 2002/0105933 | A1 | 8/2002 | Higuchi |
| 2003/0219005 | A1* | 11/2003 | Isnard et al. ............... 370/350 |
| 2004/0008646 | A1* | 1/2004 | Park et al. .................. 370/331 |

FOREIGN PATENT DOCUMENTS

| JP | 2003-102053 | 4/2003 |
| WO | 98/15084 | 4/1998 |
| WO | 01/78259 | 10/2001 |

OTHER PUBLICATIONS

Sophia Antipolis, TSG-RAN Working Group 3 meeting #6, France, Aug. 23-27, 1999.*
Abraham, S. et al., "Effect of Timing Adjust Algorithms on IUB Link Capacity for Voice Traffic in W-CDMA Systems," IEEE 56th Vehicular Technology Conference Proceedings, Vancouver, Canada, (Sep. 24-28, 2002).
Third Generation Partnership Project, "Technical Specification Partnership Project; Technical Specification Group Radio Access Network; Synchronization in UTRAN Stage 2, (Release 1999)," 3G TS 25.402 v3.1.0 (Mar. 2000).

(Continued)

*Primary Examiner*—Seema S Rao
*Assistant Examiner*—Wanda Z Russell
(74) *Attorney, Agent, or Firm*—Volpe and Koenig, P.C.

(57) ABSTRACT

A method for transmitting a data frame in a wireless communication system begins by creating a time of arrival (TOA) window, including a window start (WS) and a window end (WE). The TOA of the data frame at the air interface for transmission is determined, and further action is taken depending upon when the data frame arrives relative to the TOA window. The data frame is buffered if the TOA is before the WS. The data frame is transmitted if the TOA is within the TOA window. The data frame is discarded if the TOA is after the WE.

7 Claims, 8 Drawing Sheets

OTHER PUBLICATIONS

Third Generation Partnership Project, "Technical Specification Partnership Project; Technical Specification Group Radio Access Network; Synchronization in UTRAN Stage 2, (Release 1999)," 3G TS 25.402 v3.10.0 (Jun. 2002).

Third Generation Partnership Project, "Technical Specification Partnership Project; Technical Specification Group Radio Access Network; Synchronization in UTRAN Stage 2, (Release 4)," 3G TS 25.402 v4.6.0 (Dec. 2002).

Third Generation Partnership Project, "Technical Specification Partnership Project; Technical Specification Group Radio Access Network; Synchronization in UTRAN Stage 2, (Release 5)," 3G TS 25.402 v5.2.0 (Jun. 2003).

Third Generation Partnership Project, "Technical Specification Partnership Project; Technical Specification Group Radio Access Network; Synchronization in UTRAN Stage 2, (Release 6)," 3G TS 25.402 v6.0.0 (Dec. 2003).

TSG-RAN Working Group 3, "Definition of TOA, ToAWS and ToAWE in 25.401 (.427 & .435)," TSG R3 #6 (99) 875, Meeting #6, Sophia Antipolis, France, Aug. 23-27, 1999.

* cited by examiner

METHOD FOR DOWNLINK TRANSMISSION SYNCHRONIZATION AND DATA BUFFER SIZING IN A RADIO ACCESS NETWORK

CROSS REFERENCE TO RELATED APPLICATION(S)

This application claims priority from U.S. Provisional Application No. 60/482,300, filed Jun. 25, 2003, which is incorporated by reference as if fully set forth herein.

FIELD OF INVENTION

The present invention generally relates to downlink data transmission synchronization strategies in wireless communications and, more particularly, to algorithms for downlink data transmission synchronization and data buffer sizing in a radio access network.

BACKGROUND

Radio link transmission is a synchronous communication. Through the use of frame offsets, the serving radio network controller (S-RNC) establishes a time line for transmitted data relative to the broadcast channel (BCH), which serves as a time reference. The connection frame number (CFN) is not transmitted over the air interface. Instead, it is mapped by L1 (the air interface) to the system frame number (SFN), by using the L1 frame counter and a frame offset. The SFN is broadcast by L1 in the BCH. Data frames must be available at L1 on time for transmission at a specific CFN. This requires accurate and coordinated timing of each network node and transmission link on the data path there between. It is desirable to provide a system and method for handling downlink data transmission and for optimally sizing data buffers that are related to the transmission synchronization.

SUMMARY

The present invention provides a method for downlink data transmission synchronization and related buffer sizing in radio access networks (RAN) in general, and in particular, in radio access networks in universal mobile telecommunications systems (UMTS). The invention is also applicable to other transmission systems. The present invention deals with the parameters of tight time of arrival (TOA), tight buffer size, downlink data transmission timing fine tuning through timing adjustment, and an advanced approach for radio access network frame number (RFN)/connection frame number (CFN) offset adjustment using quality of service (QoS) input.

The present invention provides simple and efficient implementation strategies for downlink data transmission synchronization handling that aim to avoid data dropping and related degradation in QoS. Target CFN initialization at transport bearer setup and subsequent time adjustment handling are addressed. Effective TOA window parameter setting, buffer design criteria, and TOA computation implementation with wrap-around constraints are provided. Moreover, an advanced approach for RFN/CFN offset adjustment using QoS input, TOA sampling, transport bearer multiplexing, and processing capacity multiplexing information is presented. Fine-tuning of the RFN/CFN offset using a time alignment procedure is covered.

A method for transmitting a data frame in a wireless communication system begins by creating a time of arrival (TOA) window, including a window start (WS) and a window end (WE). The TOA of the data frame at the air interface for transmission is determined, and further action is taken depending upon when the data frame arrives relative to the TOA window. The data frame is: (1) buffered if the TOA is before the WS, (2) transmitted if the TOA is within the TOA window, or (3) discarded if the TOA is after the WE.

A method of adjusting the timing of a data frame for transmission in a wireless communication system begins by receiving a timing adjustment control frame containing a time of arrival (TOA) value for the data frame. An offset value based on the TOA value is calculated. A target connection frame number (CFN) for the data frame is obtained and the offset value is applied to the target CFN, to obtain an adjusted CFN. The data frame is transmitted at a time corresponding to the time of the adjusted CFN.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, a Node B, a site controller, an access point, or any other type of interfacing device in a wireless environment. It is noted that the numerical ranges and values provided in the description are exemplary, and that the concepts of the present invention are equally applicable to other numerical ranges and values.

Figure 1:
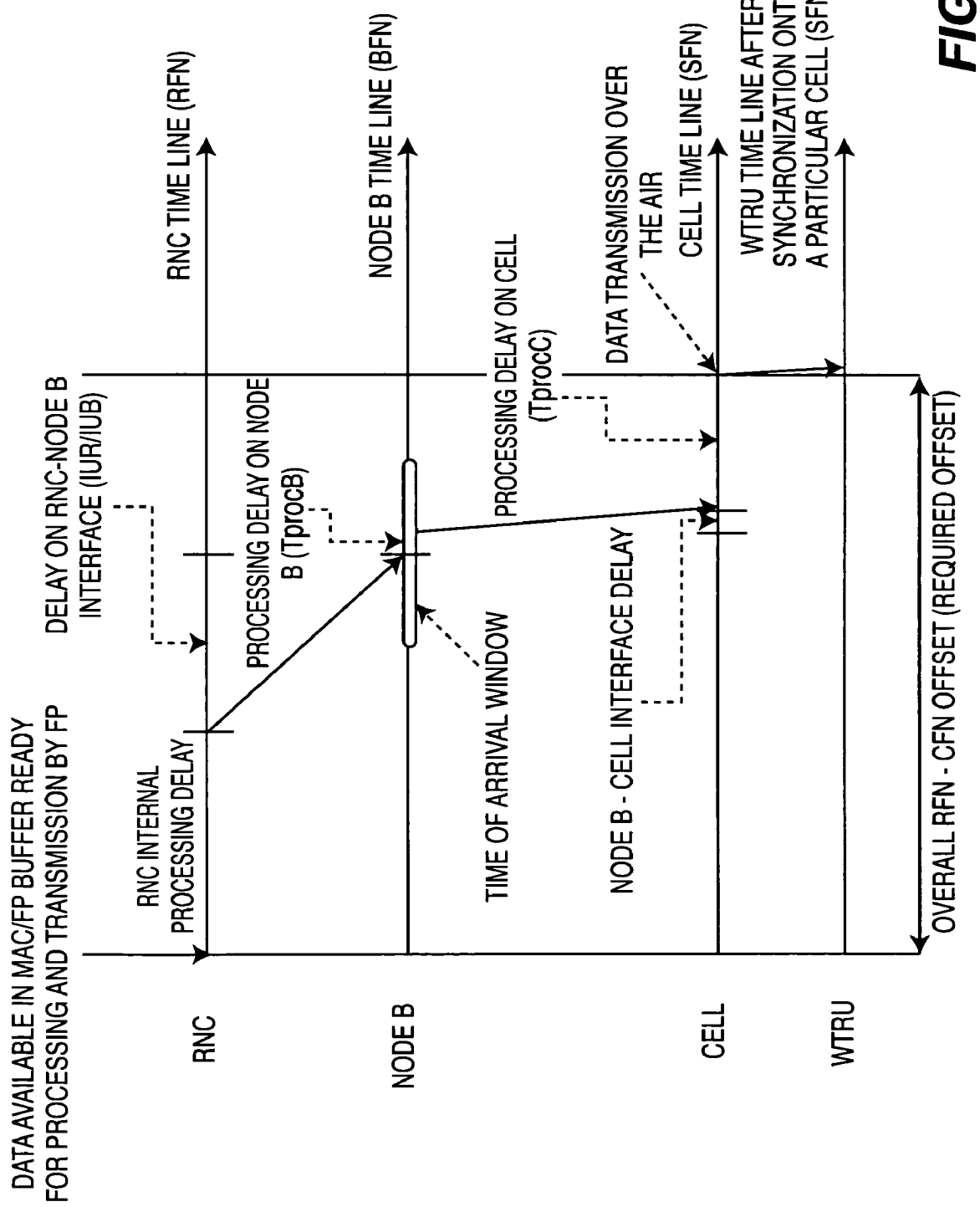
FIG. 1 is a downlink transmission time line from a radio network controller (RNC) to a wireless transmit/receive unit (WTRU)

FIG. 1 is a timing diagram showing downlink (DL) transmissions from a RNC to a WTRU. The main delay components include:

1. RNC internal processing delay, which from the timing adjustment perspective includes frame protocol (FP) and other RNC sublayers on the data path under FP within the RNC. This processing delay definition assumes that the MAC protocol data unit (PDU) is prepared and ready to be transferred to the FP entity. Therefore, at the transmission time interval (TTI) boundary of the considered transport channel (or the coordinated transport channels if there are only dedicated channels (DCHs)), it is assumed that the MAC process has been initiated and has already performed the transport format combination indicator (TFCI) selection for the coded composite on which the transport channel is multiplexed.

Moreover, the MAC has requested the data from the radio link control (RLC) buffer and this data has been already made available to the MAC.

2. Iur/Iub delay, which represents the travel time of the frame over the Iur/Iub interface.

3. Node B processing delay, TprocB, which includes the waiting time of the frame in the FP process queue, cyclic redundancy check (CRC) computation (header and optionally payload for DCHs), and routing processing. TprocB can be aggregated with the Iur/Iub delay.

4. Node B-cell interface delay, which represents the travel time of the frame between the cell and the Node B.

5. Cell processing delay, TprocC, which represents the overall processing time on the cell, including the data transfer between cell processes down to the L1 processor.

The need for timing adjustment comes from the fact that there is variation (jitter) in the overall DL delay. Timing adjustment is used to adapt the RNC transmission time such that each data frame is available at L1 on time for transmission on the air interface. Due to the various sources of delay, the frame needs to arrive at each processing stage within a certain time, in order to be at L1 in time for transmission.

A frame that arrives too late will be discarded by the cell or the Node B, thus degrading the QoS. A frame that arrives too early will be buffered. In the latter situation, a frame could also be discarded if there is no space in the buffer, i.e., in a buffer overflow situation. The jitter values (especially on the Iur/Iub interface), and consequently the DL transmission delay, can be considered as random variables with a certain probability distribution. The jitter on the Iur/Iub interface depends to some degree on the data link technology used; for example, asynchronous transfer mode (ATM) technology will most likely exhibit more jitter than an Ethernet technology.

The time of arrival (TOA) is a random variable that measures the jitter. A control window can be designed around the desired arrival time of the frame with a certain level of confidence. This window, called a TOA window, is characterized by two end-points, TOA window start (TOAWS) and TOA window end (TOAWE). TOAWS and TOAWE are determined by the RNC and are signaled to the Node B during the setup or reconfiguration of the transport bearers.

Figure 2:
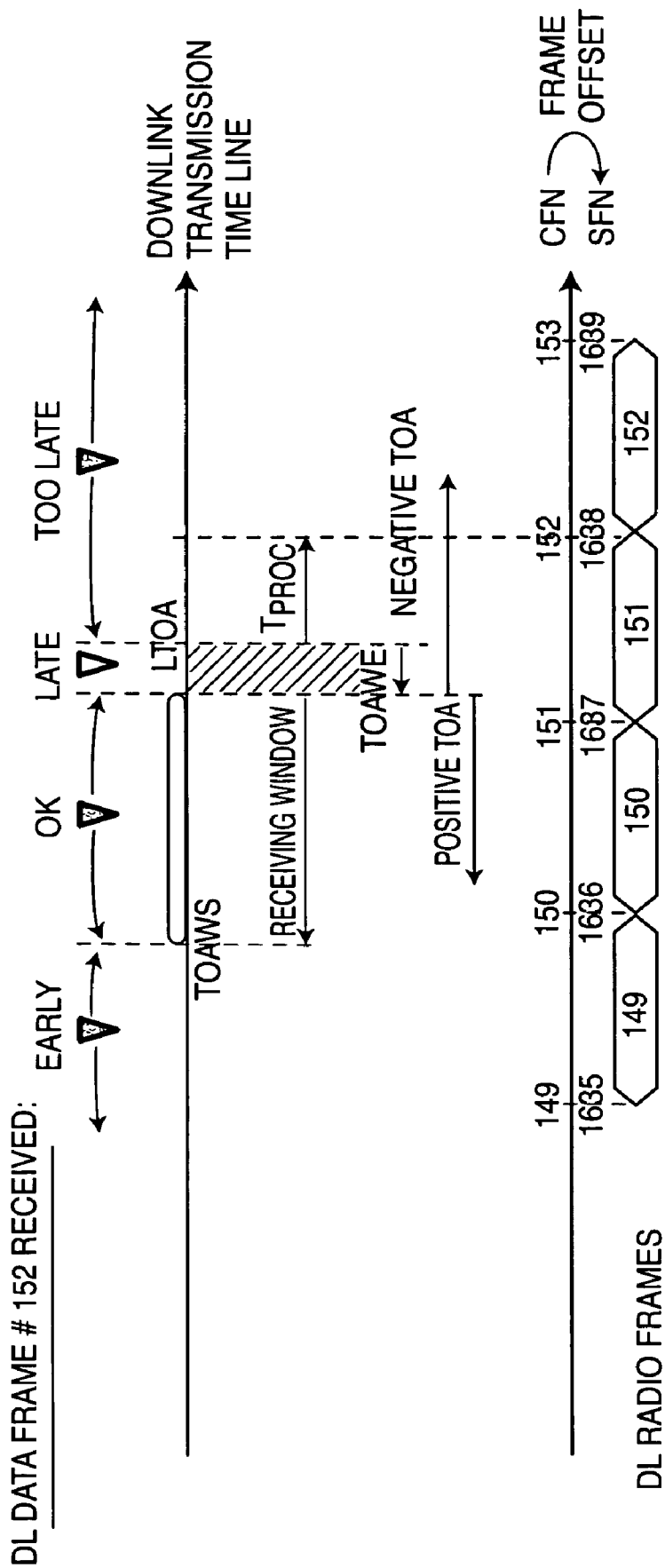
FIG. 2 is a diagram showing the time of arrival (TOA) window and related parameters.

These definitions are shown diagrammatically in FIG. 2. As an example, assume that a confidence level of 99% is selected as a design parameter. With a careful design of the window, 99% of the transmitted data frames will fall into the expected window, leaving 1% of the transmitted data frames with a possibility of being discarded. This percentage of dropped frames can be further reduced with the remedy effect of the late time of arrival (LTOA) margin on TOAWE and the buffering of early frames. A correction to handle the trends is then applied by invoking the timing adjustment.

While the timing adjustment control procedure is specified in the 3GPP specifications, there are no guidelines for the TOA window parameter design. Nor is there a directive on the calculation of TOA (with CFN wrap-around consideration) or on the determination of the adjustment to apply to the data transmission time at the RNC (MAC) when a timing adjustment control frame is received from the Node B.

Algorithms

I. Location of Node B Frame Protocol and Timing Adjustment Handling

In 3GPP, the Node B-cell interface is not standardized, and there is an assumption that both the Node B and the cell reside physically on the same hardware. However, a vendor could choose an architecture where a cell and the Node B reside at different locations and therefore on different pieces of hardware. In such cases, at the Node B-cell side of the Iub interface, the location of the FP entity can have an impact on the DL transmission timing control. Two possible locations for the FP entity are examined: on the Node B and on the cell.

If the FP entity is implemented on the Node B, the TOA computation will not directly take into account the Node B-cell interface delay, especially at the channel setup. Under this scenario, one idea is to set the cell processing time with an extra margin to account for the Node B-cell interface delay. The drawback of this design choice is the difficulty to quickly react to jitters on the Node B-cell interface and the resulting larger buffer build-up on the cell side with unacceptable service delay. This difficulty can be overcome by performing a procedure similar to the timing adjustment over the Node B-cell interface. At the reception of a timing adjustment control frame from the cell, two alternatives are available: (a) the Node B sends a timing adjustment control frame to the RNC; or (b) the Node B autonomously changes the estimation of the cell processing time value to be used in future computations of TOA.

While alternative (b) will also lead to the generation of a timing adjustment control frame by the Node B, from an implementation and performance point of view, alternative (a), which relies on a just-in-time strategy, is cleaner and has fewer variables to maintain. Also with alternative (a), there is no need to add an extra margin to the cell processing parameter (TprocC) and consequently, the buffer size on the cell side can be relatively small with little service delay. If both the SFN and BFN (Node B frame number) are not locked to each other, there is a possibility of long-term clock drift, which adds to the difficulty of timing adjustment handling when the FP is implemented on the Node B. However, if the cell is mapped to hardware with limited processing capability, then it might be desirable to offload the cell by implementing the FP handling on the Node B.

If the FP entity is implemented on the cell, both the delays over the Iur/Iub interface and the Node B-cell interface are combined and are directly taken into account in the TOA computation. The processing time estimation strictly corresponds to the processing time on the cell, which results in a better approach from a timing adjustment perspective. Also, the SFN is directly available and there is no need to have an extra conversion step from BFN to SFN.

As described herein, the FP entity resides on the Node B integrated on the same platform with the cells under control of the Node B, where both the Node B and the cells communicate over a high-speed bus at the hardware level, as opposed to a configuration where both nodes communicate with each other via a socket-like interface.

II. Time of Arrival Window and Buffer Size Design Considerations

A design goal for the window size is to have the FP frames arrive at the Node B at the following times:

1. No later than the reference time (TOA=0) when the estimated Iur/Iub delay is at a maximum.

2. No earlier than TOA=TOAWS when the Iur/Iub delay is at a minimum.

The relationship of TOA, TOAWS, and TOAWE can be seen with reference to FIG. 2. TOA and TOAWE have different origin points. The origin point for TOAWE is LTOA and is counted from right to left; i.e., TOAWE is always a positive value. The origin point for TOA is TOAWE, and is counted positively from TOAWE to the left and negatively from TOAWE to the right.

A frame that is not too late for transmission (TOA$\geq$-TOAWE; the cross-hatched area between TOAWE and LTOA as shown in FIG. 2) will be considered for buffering and will be transmitted at the target CFN included in the frame header by the RNC. The buffer size is greater than or equal to (TOAWS+TOAWE)/TTI, and is expressed in the same units as TOAWS and TOAWE.

A frame arriving too late (TOA<−TOAWE; to the right of LTOA as shown in FIG. 2) will be discarded.

TOAWE is used to provide an extra margin on LTOA, such that late-arriving frames can still be processed. Therefore, TOAWE can be set to any valid arbitrary value. However, from an effective timing adjustment handling perspective, TOAWE should be set to a small number (one or two times TTI). If TOAWE is a large value, then the buffer size must also be large. This could cause a large buffer delay of a data frame, which could lead to frame collision (two different data frames with the same target CFN) and eventually frame drop, in the scenario where the target CFN is adjusted backward to handle the situation where frames are being received too early. Frames sent previously with the same target CFNs could still be waiting in the Node B-cell side buffer for transmission over the air interface, resulting in a collision.

The TOAWS value is a measure of the variance of DL transmission delay between the RNC and the Node B for a given confidence level. The DL transmission delay between the RNC and the Node B can be modeled using a probability distribution, such as a normal distribution. A sample of the DL delay values can be gathered by using a node synchronization procedure. For this purpose, the node synchronization procedure is executed on both a high priority channel and a regular traffic channel. The execution of the node synchronization procedure on the high priority channel is used to estimate the time difference between the Node B clock and the RNC clock, in terms of the current frame number at both locations. The difference between the clocks is easy to determine, since it is assumed that there is no delay on the high priority channel. This estimated time difference is then used as a correction factor to the DL delay statistics gathered on a regular traffic channel (which has a delay), in order to offset the time difference component of the measurement. While the node synchronization procedure is described in 3GPP, its usage in support of timing adjustment and DL delay estimation is left to vendor implementation.

TOAWS can be set as $k \times \sigma$, where k is an integer according to the desired confidence level and $\sigma$ is the standard deviation of the DL transmission distribution. Since the TOA value range is {−1280 ms, +1279.875 ms}, it is reasonable to impose the constraint that TOAWS≦T_CFN/2=1.28 sec. (or 20.48 sec. for the physical channel (PCH)). The CFN range is from 0 to 255; i.e., the CFN cycle spans 256 radio frames, with each frame being 10 ms wide. T_CFN is the CFN cycle length, which is 2560 ms.

Given the service end-to-end delay and the fact that TOAWS is strongly correlated with the DL transmission delay, it is also reasonable to impose the constraint that TOAWS<$\alpha \times$ADJ, where ADJ denotes acceptable delay jitter on the DL over the Iub/Iur interface given the overall delay acceptable for the type of service being considered, and $\alpha$ is a coefficient between {0,1}. The delay jitter is the variation present in the delay, not the delay itself. The delay between the RNC and the Node B is not constant, due to varying traffic levels in the system. This variable delay is the reason for using the TOA window; if the delay was constant, the window would not be needed because the TOA of the frame would always be known.

Both ADJ and $\alpha$ can be configurable parameters, and the parameters of the probability distribution (normal distribution) must be selected such that TOAWS=$(k \times \sigma)<(\alpha \times$ADJ). The design objective is similar to TOAWE, in that the TOAWS value should be set such that the buffer delay is small. Especially for real time (RT) services, TOAWS could be set to no more than 100 ms. For conversational voice and video services, the preferred end-to-end delay is about 150 ms.

The buffer on Node B-cell side should be large enough to hold all of the data frames with −TOAWE<TOA≦TOAWS. The negative TOAWE value will encompass any frames in the window as well as late arriving frames (i.e., any frames between TOAWS and LTOA as shown in FIG. 2). This leads to a buffer size of:

$$[(TOAWS+TOAWE)/TTI] \quad \text{Equation (1)}$$

In case of a variable TTI, the smallest TTI is used. Data that arrives early at the Node B (TOA>TOAWS) can still be buffered, but the buffer size is designed to hold only the data frames with −TOAWE<TOA≦TOAWS. With respect to the preferred design constraints imposed on TOAWS, the buffer size can be defined as:

$$[((\alpha \times ADJ)+TOAWE)/TTI] \quad \text{Equation (2)}$$

This boundary can be a tied bound in the case of RT services, especially if TOAWE is suitably selected, and can provide a design advantage by avoiding the need to use a probability model.

III. TOA Computation

The TOA is computed as part of FP processing on the Node B. ScheduleCFN is the CFN value included in the frame received from the RNC and CurrentCFN is the CFN number (with respect to the SFN counter) that corresponds to the arrival time of the frame received from the RNC.

The following parameters are defined:
1. ScheduleSFN is the SFN at which the data should be transmitted on the air by L1.
2. CurrentSFN is the current SFN.
3. $SFN_{time}$ is the time that corresponds to a given SFN on the time axis expressed in ⅛ ms units.
4. $CFN_{time}$ is the time that corresponds to a given CFN on the time axis expressed in ⅛ ms units.

The TOA value is transferred over the Iub interface with ⅛ ms resolution. TOA can then be represented as an integer (16 bits for non-PCH channels and 20 bits for PCH channels). Its computation is based on the following assumptions:
1. TOAWS and TOAWE usage are based on their definitions in the NBAP specification (TS 25.433, 3GPP Technical Specification Group Radio Access Network: URTAN Iub Interface NBAP Signaling, section 9.2.1.61 for TOAWS and section 9.2.1.60 for TOAWE). TOAWS is a positive relative value with respect to the endpoint of the receiving window, while TOAWE is a positive relative value with respect the LTOA point on the time axis.
2. At transport bearer setup or reconfiguration, TOAWS and TOAWE are stored in a database in ⅛ ms units.
3. Tproc is an estimate of the processing time on the cell together with the Node B-cell interface delay stored in ⅛ ms units.
4. CurrentBFNtime, the time that corresponds to the current Node B frame number, is received through an API call to a timer library and is expressed in ⅛ ms units.
5. CurrentSFNtime=CurrentBFNtime+SFN_BFN_Offset. SFN_BFN_Offset is the difference between the SFN and the BFN and is in the range {−40959.875 ms×8, . . . 0, . . . +40959.875 ms×8}={−327679, . . . 0, . . . +327679} in resolution of ⅛ ms units.
6. Radio Frame Period=10 ms×8=80 in ⅛ ms units.

In general, the TOA is defined as:

$$TOA=(ScheduleTime-Tproc-TOAWE)-CurrentTime \quad \text{Equation (3)}$$

In SFN reference, TOA is expressed as:

$$TOA = (ScheduleSFN_{time} - Tproc - TOAWE) - CurrentSFN_{time} \quad \text{Equation (4)}$$

In CFN notation, TOA can also be expressed as:

$$TOA = (ScheduleCFN_{time} - Tproc - TOAWE) - CurrentCFN_{time} \quad \text{Equation (5)}$$

that is:

$$TOA = (ScheduleCFN - CurrentCFN) \times 80 - (CurrentSFN_{time} - \lfloor(CurrentSFN_{time}/80)\rfloor \times 80) - (TOAWE + Tproc) \quad \text{Equation (6)}$$

Equations (3)-(6) do not take into account the wrap-around effect of the CFN value that is kept between $\{0, 255\}$. Also these equations do not take into account the fact that the TOA range is $\{-1280 \text{ ms}, 1279.875 \text{ ms}\}$. These constraints are taken into account by additional steps discussed below.

In order to save on computation performance, the quantity $$\lfloor(CurrentSFN_{time}/80)\rfloor \quad \text{Equation (7)}$$

should be evaluated only once and then be re-used in both the CurrentCFN and TOA formulas.

CurrentCFN is computed with the following formulas:

For the dedicated channel (DCH) and the DL shared channel (DSCH), $$CurrentCFN = (\lfloor(CurrentSFN_{time}/80)\rfloor + 256 \rfloor - Frame\ Offset) \bmod 256 \quad \text{Equation (8)}$$

For the forward access channel (FACH), $$CurrentCFN = \lfloor(CurrentSFN_{time}/80)\rfloor \bmod 256 \quad \text{Equation (9)}$$

For the PCH, $$CurrentCFN = \lfloor(CurrentSFN_{time}/80)\rfloor \bmod 4096 \quad \text{Equation (10)}$$

IV. TOA Computation with CFN Wrap-Around Constraints

For the DCH, the DSCH, or the FACH, the CFN is within a $\{0, 255\}$ range and the TOA is within a $\{-1280, 1279.875 \text{ ms}\}$ range, i.e., $\{-10240, 10239\}$ in ⅛ ms units range.

For the PCH, the CFN is within a $\{0, 4095\}$ range and the TOA is within a $\{-20480 \text{ ms}, +20479.875 \text{ ms}\}$, i.e., $\{-163840, +163839\}$ in ⅛ ms units range.

Figure 3:
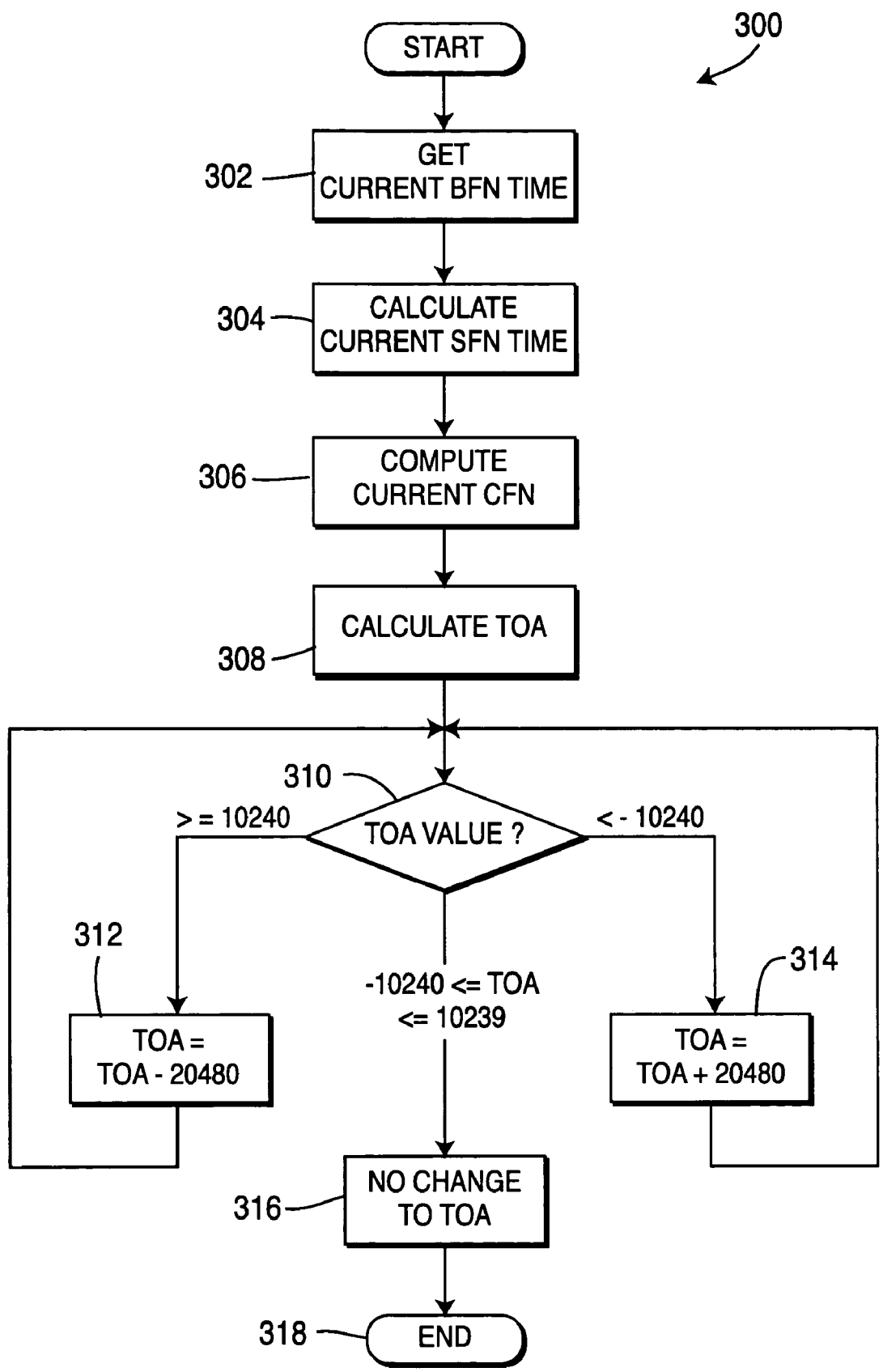
FIG. 3 is a flowchart of a method for computing the TOA.

The wrap-around constraints on the CFN can be taken into account by simply ensuring that the TOA is within the range described above. A method 300 for calculating the TOA for the DCH, the DSCH, or the FACH is shown in FIG. 3. The method 300 begins by getting the CurrentBFNtime (step 302). Then, the CurrentSFNtime is calculated (step 304) according to:

$$CurrentSFNtime = (CurrentBFNtime + SFN\_BFN\_Offset) \quad \text{Equation (11)}$$

SFN_BFN_Offset is expressed in ⅛ ms units. Also at the L1, the relation SFN=(BFN+SFN_BFN_Offset) is used for the SFN_BFN_Offset calculation.

The value of CurrentCFN is computed according to Equations (8) or (9) (step 306). Next, the TOA is calculated according to Equation (6) (step 308).

The TOA value is then evaluated (step 310). If TOA≧10240, then TOA=TOA=TOA−20480 (step 312). The method then returns to step 310 to evaluate the adjusted TOA value. If TOA<−10240 (step 310), then TOA=TOA+20480 (step 314). The method then returns to step 310 to evaluate the adjusted TOA value. If −10240≦TOA≦10239 (step 310), then no change is made to the TOA value (step 316) and the method terminates (step 318). Steps 312 or 314 are performed if the calculated TOA value is outside the prescribed range, and the adjustment is made in an attempt to bring the TOA value back into range.

As an example of the method 300, assume that: Tproc=0 ms; TOAWE=0 ms; Frame Offset=0; ScheduleCFN=0; and CurrentSFN$_{time}$=2550 ms, i.e., 20400 units (in ⅛ ms). CurrentCFN=floor (20400/80) mod 256=255. Based on these values and preliminary calculations, $$TOA = (0-255) \times 80 - 0 - (0+0) = -20400$$

Since TOA<−10240, then TOA=−20400+20480=+10 ms.

Figure 4:
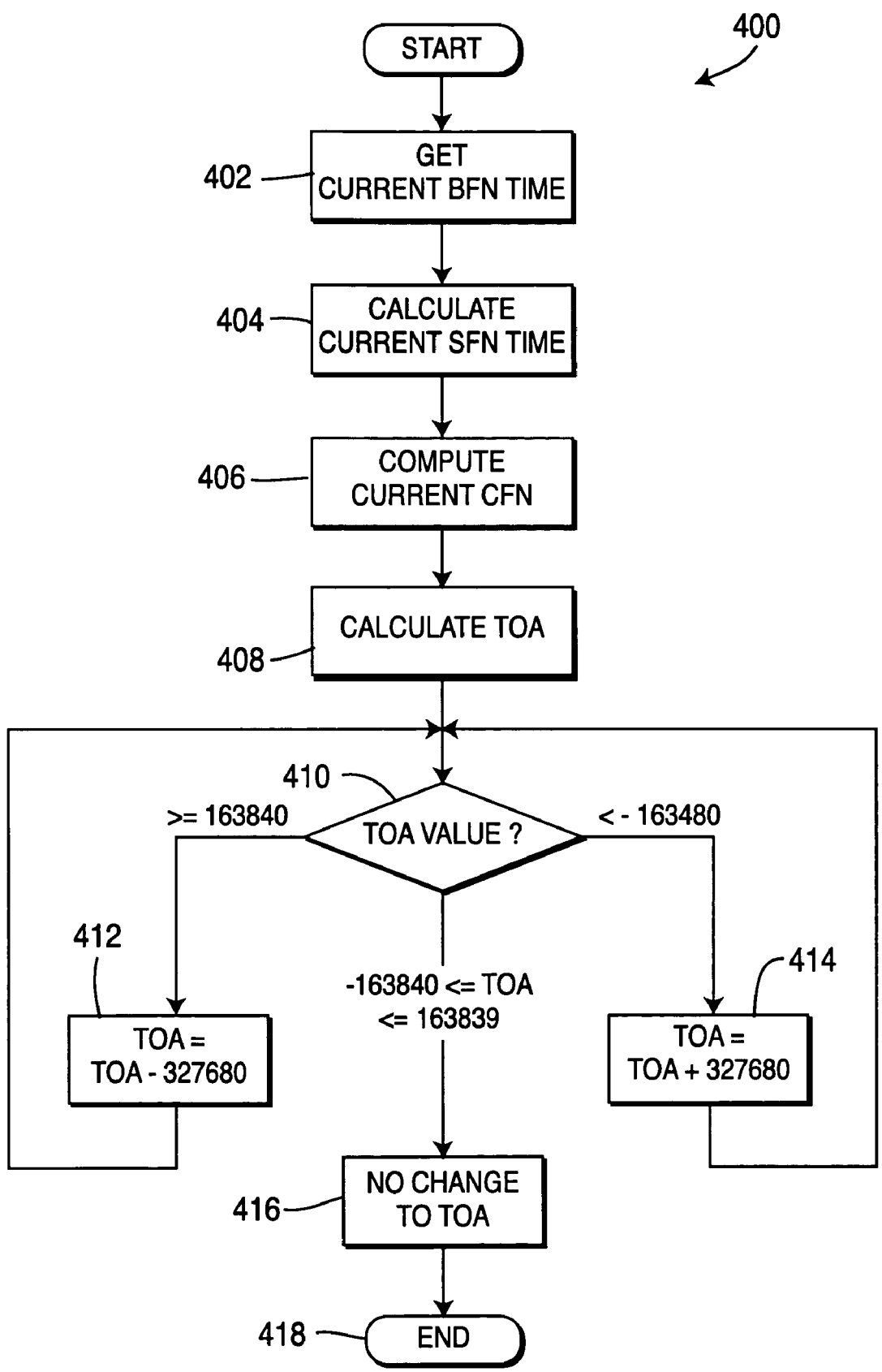
FIG. 4 is a flowchart of another method for computing the TOA.

A method 400 for calculating the TOA for the PCH is shown in FIG. 4. The method 400 begins by getting the CurrentBFNtime (step 402). Then, the CurrentSFNtime is calculated (step 404) according to:

$$CurrentSFNtime = (CurrentBFNtime + SFN\_BFN\_Offset) \times ⅛ \quad \text{Equation (12)}$$

The value of CurrentCFN is computed according to Equations (8) or (9) (step 406). Next, the TOA is calculated according to Equation (6) (step 408).

The TOA value is then evaluated (step 410). If TOA≧163840, then TOA=TOA=TOA−327680 (step 412). The method then returns to step 410 to evaluate the adjusted TOA value. If TOA<−163840 (step 410), then TOA=TOA+327680 (step 414). The method then returns to step 410 to evaluate the adjusted TOA value. If −163840≦TOA≦163839 (step 410), then no change is made to the TOA value (step 416) and the method terminates (step 418). Steps 412 or 414 are performed if the calculated TOA value is outside the prescribed range, and the adjustment is made in an attempt to bring the TOA value back into range.

V. Target CFN Initialization

The CFN initialization includes computing the target CFN of the first transport block set (TBS) to be transmitted. A CFN is associated with every TBS sent to L1 by L2 (the MAC). The transport channel synchronization procedure is used to initialize the CFN, i.e., the transmission time of the first TBS for a given connection. Once a CFN is assigned to a frame, the frame is sent on that CFN, so it is important to assign a CFN such that the frame can be properly processed prior to transmission. For example, if the target CFN is 80, sending the frame at frame number 78 could lead to buffering and sending the frame at frame number 82 could cause the frame to be dropped. The transport channel synchronization procedure can also be used to perform TOA sampling in support of timing adjustment.

Figure 5A:
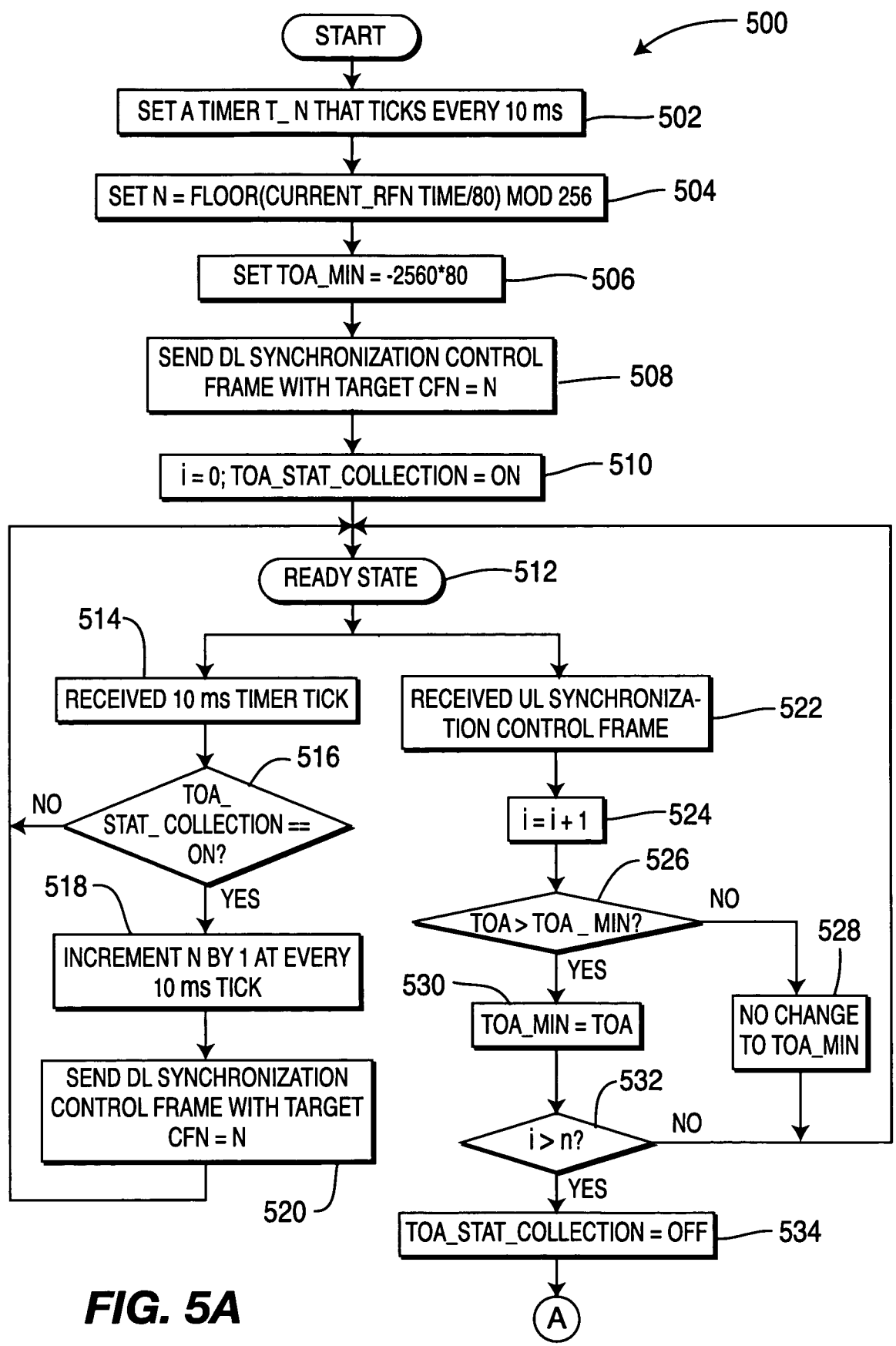
FIGS. 5a and 5b are flowcharts of a method for calculating an initial CFN value.
Figure 5B:
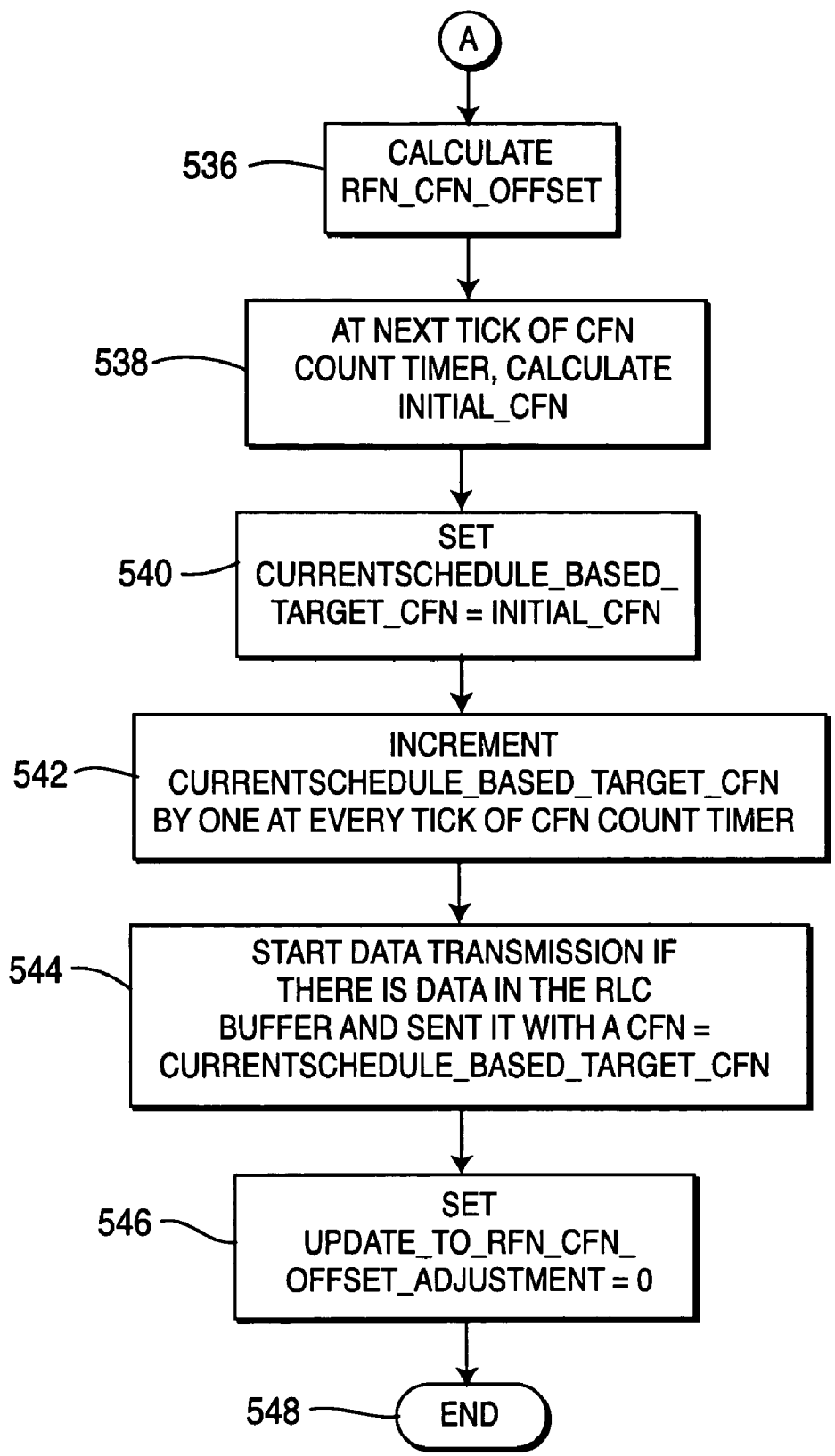

A method 500 for target CFN initialization is shown in FIGS. 5a and 5b. The method 500 begins by setting a count timer (T_N, step 502) that ticks every 10 ms, i.e., the length of one radio frame. An initial value for N, which is used to find a target CFN value, is set (step 504) according to the equation:

$$N = \lfloor(CurrentRFN_{time}/80)\rfloor \bmod 256 \quad \text{Equation (13)}$$

Then an initial value for TOA_min is set (step 506). According to the 3GPP specification, TOA is in a range of $\{-1280 \text{ ms}, \ldots, +1279.875 \text{ ms}\}$. An arbitrary strict lower bound can therefore be set on TOA as TOA_min=−2560×80, expressed in ⅛ ms units. TOA_min is set to such a low value so that the sampling to be performed will permit the collection of the largest TOA value, which will be greater than TOA_min. There is no need to align the CFN boundary with RFN boundary; the objective is to align CFN boundary to the SFN boundary.

A DL synchronization control frame is transmitted, with the target CFN equal to N obtained at step 504 (step 508). To perform the sampling, which is done in order to obtain a better estimate for the target CFN, the DL synchronization control frame is sent a predetermined number (n) times, each time with a different target CFN value. In one exemplary implementation, the default value of n is 2. Next a counter (i) is initialized and is used to count the number of samples collected, and a TOA statistic collection flag (TOA_Stat_Collection) is set to "on" to indicate that TOA statistics should be collected (step 510). After the variables have been initialized, the method is in a ready state, waiting to respond to an action from the system (step 512).

If the action is that a 10 ms timer tick is received from the timer T_N (step 514), a determination is made whether the system is collecting TOA statistics (whether the TOA_Stat_ Collection flag is set to "on"; step 516). If the system is not presently collecting TOA statistics, then the method returns to the ready state (step 512). If the TOA statistics are being collected (step 516), then the value of N is incremented by one at every 10 ms tick of the timer (step 518). Next, a DL synchronization control frame with a target CFN equal to the incremented value of N is sent (step 520) and the method returns to the ready state (step 512).

If the action is that an uplink (UL) synchronization control frame is received (step 522), this indicates that the Node B has received the previously sent DL synchronization control frame and sends the UL control frame to the RNC, which contains the Node B frame number corresponding to the received frame. Because the method 500 is being used to calculate the target CFN, the DL frame number and the UL frame number should be different. The TOA of the DL control frame is also calculated in step 522. The sample counter is then incremented by one (step 524).

A determination is made whether the current TOA value is greater than TOA_min (step 526). If TOA is not greater than TOA_min, then no change is made to TOA_min (step 528), and the method returns to the ready state (step 512). If TOA is greater than TOA_min (step 526), then TOA_min is set to the current TOA value (step 530). A determination is then made whether all of the predetermined number of samples have been collected (i>n; step 532). If all of the samples have not been collected, then the method returns to the ready state (step 512). If all of the samples have been collected (step 532), then the TOA statistic collection is turned off (step 534).

The first portion of the method 500 (up to step 534) is used to collect statistics for calculating the target CFN, while the second portion of the method 500 (from step 536 on) determines the actual target CFN value to be used. The method 500 next computes a RFN_CFN_Offset value (step 536) according to one of two alternatives.

In the first alternative, the end of the TOA window is targeted, where data frames arrive at the Node B-cell just in time for transmission over the air interface, so there is no unnecessary initial data buffering. By targeting the end of the TOA window, buffer delay is reduced and the risk of a frame being received too early before its scheduled transmission time at the Node B-cell is minimized. From a time adjustment perspective, it is desirable to minimize the buffer delay to avoid a frame arriving at the Node B too early. Timing adjustment performs better with a frame being late than a frame being early. In this alternative, the offset is defined as:

$$RFN\_CFN\_Offset = -\lfloor TOA\_min/80 \rfloor \qquad \text{Equation (14)}$$

The second alternative is to target the middle of TOA window, which is a more conservative approach. Data frames arrive at the middle of the window, reducing the probability of having frames arrive too early or late. However, the buffer delay is increased, since data will be buffered before transmission. This approach also increases the end-to-end delay, which makes the first approach preferable. If TOA=TOAWS/2 (i.e., exactly in the middle of the window), then RFN_CFN_Offset=0, because no adjustment needs to be made, since the middle of the window has already been targeted. Otherwise, the offset is defined as:

$$RFN\_CFN\_Offset = -\lfloor (TOA\_min - TOAWS/2)/80 \rfloor \qquad \text{Equation (15)}$$

It is noted that while the equation used to calculate the offset is the same, the effect of the offset depends upon the value of TOA_min.

If TOA_min≦0, this indicates that the frame is late, and the application of the offset will target the beginning of the window by providing additional delay to hit the desired frame number.

If TOA_min>TOAWS, this indicates that the frame arrived too early and that the delay was overestimated. The offset is used to decrease the delay to target the end of the window.

If 0<TOA_min<TOAWS/2, this indicates that the frame arrived in the first half of the window. The offset is used to target the second half of the window, towards the start of the window. Because positive values are counted from TOAWE towards TOAWS, the first half of the window has a lower TOA value, even though is would appear to the right of TOAWS as shown in FIG. 2.

If TOAWS/2<TOA_min<TOAWS, this indicates that the frame arrived in the second half of the window. The offset is used to target the first half of the window, towards the end of the window.

After the RFN_CFN_Offset has been calculated, at the next tick from the count timer set at step 502, the initial CFN value is set (step 538).

$$Initial\_CFN = N + RFN\_CFN\_Offset \qquad \text{Equation (16)}$$

Then set CurrentSchedule_Based_Target_CFN=Initial_CFN (step 540). From now on, CurrentSchedule_Based_Target_CFN is incremented by one at every tick of the CFN count timer (step 542). CurrentSchedule_Based_Target_CFN is the scheduled target CFN, including any offset; once this variable is set, it is used as a counter, since it represents the current target CFN.

Data transmission is started if there is data in the RLC buffer (after system processing) and is assigned a CFN=CurrentSchedule_Based_Target_CFN (step 544).The variable Update_To_RFN_CFN_Offset_Adjustment is set to zero (step 546), and is used to track an adjustment to RFN_CFN_Offset, as described below. The method then terminates (step 530).

An accurate CFN initialization avoids unnecessary initial data build-up in the RLC buffers. Therefore, the CFN initialization procedure should start as soon as the transport bearer establishment is completed. It desirable to complete this procedure before the first DL data to be transmitted becomes available in the RLC buffer. The CFN initialization can be accelerated by performing periodic sampling of the TOA as a background process. In typical commercial systems, the transport bearers are configured to support different QoS levels. Sampling of the TOA should be performed for the transport bearers in each QoS category. Once a transport bearer is set up, an accurate CFN initialization can be achieved using the existing TOA information gathered through TOA sampling. The parameter n, i.e., the number of TOA samplings required to execute CFN initialization (after establishment of the transport bearer) can then be small for obtaining a fairly accurate initial CFN. For instance, TOA_min used in the CFN initialization algorithm could be a weighted average of TOA_min computed after transport bearer establishment (steps 502-510) and TOA_min obtained through background sampling.

If the initial RFN_CFN_Offset adjustment computation is performed in a process other than MAC (in the RRC for instance), when the MAC applies this initial adjustment to obtain the initial CFN, the value of the initial CFN could have an offset error of one frame unless the MAC process has access to the tick count provided by timer set in step 502 and the corresponding CFN counter (the current value of N from steps 504 or 518).

VI. RFN_CFN_Offset Adjustment Determination After CFN Initialization

Figure 6:
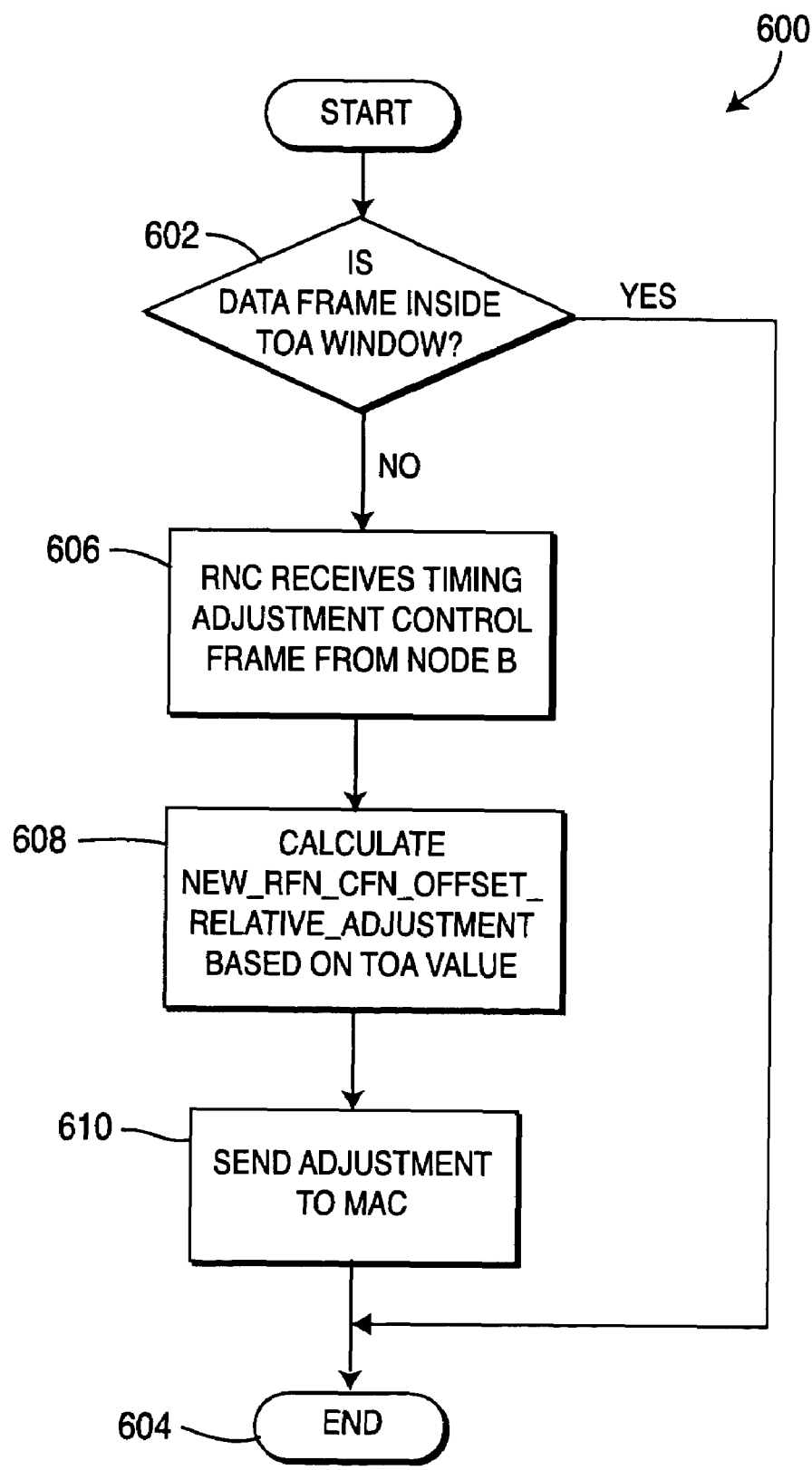
FIG. 6 is a flowchart of a method for computing the RFN/CFN offset adjustment.

A method 600 for computing the RFN_CFN_Offset adjustment is shown in FIG. 6. Before the method 600 is performed, is it assumed that the initialization procedure described above has been completed, and data transmission has begun. Due to the variable nature of the delay in the system, the exact value of the RFN_CFN_Offset is not known. The estimates calculated by the present invention are constantly adjusted to reflect this condition.

The adjustment computation can either be implemented by the RRC process and passed on to the MAC process, or can be performed directly in the MAC process. In a preferred implementation, the adjustment computation is preformed by the RRC process and is an integer number of frames. The method 600 begins by determining whether the data frame arrives inside the TOA window (step 602). If the data frame arrives in the TOA window, then no adjustments are necessary, and the method terminates (step 604).

When a data frame arrives outside of the TOA window at the Node B (step 602), a timing adjustment control frame is sent to the RNC with the TOA value (step 606). The timing adjustment control frame includes a TOA value, which indicates to the RNC how inaccurate the TOA of the frame was when it arrived at the Node B. This mechanism allows the FP on the Node B and consequently L1 to indicate back to the RNC (FP and MAC) the necessity to adjust the timing of the DL transmission. The timing adjustment (i.e., changing the RFN_CFN_Offset) is made to control and minimize the transmission delay and the buffering time for transmission on the air interface.

In an exemplary embodiment, different adjustments are applied to RFN_CFN_Offset depending on whether a frame is received late (TOA<0), too late (TOA<−TOAWE), or too early (TOA>TOAWS) at the Node B-cell (step 608). In one embodiment, the RNC applies the adjustment to the target CFN rather than to the transmission time at the RNC. Therefore, the adjustment computation formulas provided below produce the RFN_CFN_Offset adjustment as an integer number of frames, thus using the dividing factor 80. The target CFN value included in the FP data frame header is also expressed as an integer number of frames. Even in the cases where the adjustment is applied to the RNC transmission time, it is still desirable to have the adjustment expressed as an integer number of frames; otherwise, the timer guarding the CFN count tick must be re-initialized to different starting points on the time axis which may require synchronization with the core network.

If a frame is received too late at the Node B-cell, i.e., TOA<−TOAWE, this indicates that the offset was underestimated. The offset should therefore be increased and targets the middle of the window. This is a conservative approach, and helps reduce the risk of frames being dropped. The adjustment to RFN_CFN_Offset is computed as:

$$\text{New\_RFN\_CFN\_Relative\_Adjustment} = -\lfloor(\text{TOA} - \text{TOAWS}/2)/80\rfloor \quad \text{Equation (17)}$$

A frame arriving too late is an indication of a significant sudden increase in the traffic load, assuming that the design of the TOA window parameters is fairly accurate. The timing adjustment algorithm must then react quickly to correct the situation and avoid potential degradation in service quality.

If a frame is received late at the Node B-cell, i.e., −TOAWE≦TOA<0, the frame can still be processed and transmitted over the air interface.

$$\text{New\_RFN\_CFN\_Relative\_Adjustment} = -\lfloor \text{TOA}/80 \rfloor \quad \text{Equation (18)}$$

By moving the target CFN forward (with respect to RFN) by −TOA/80 frames (since TOA is negative in this case, the adjustment is a positive value), the frame should arrive at the window end point, assuming the traffic conditions remain the same. By targeting the end of the window, it is less likely that the frames will have to be buffered or dropped, since the frames will still be processed. The endpoint of the window is the ideal target CFN for these reasons. The rationale here is that the previous implicit RFN_CFN offset being used was leading to a situation of frames arriving late by TOA number of time units. An increase of this offset can be viewed as transmitting the frame earlier at the RNC side.

If a frame is received too early at the Node B-cell, i.e., TOA>TOAWS, this is an indication that the initial offset was too large, and the New_RFN_CFN_Relative_Adjustment is calculated as in Equation (18). By moving the target CFN backward (with respect to the RFN) by TOA/80 frames (TOA is a positive value in this case), the frame should arrive at the window end point assuming the traffic conditions remain the same. After the New_RFN_CFN_Relative_Adjustment value is calculated (step 608), it is sent to the MAC (step 610), and the method terminates (step 604). Based on the adjustment made in the method 600, the CurrentSchedule_Based_Target_CFN will also change, since it is based on the value of the offset.

VII. Strategies for Delaying or Accelerating Data Transmission Upon Reception of Timing Adjustment Control Frame Given the Iur/Iub delay and the processing delays on the data transmission path between the RNC and the Node B-cell, the RFN_CFN_Offset value can be characterized by two main variables: the transmission time at the RNC (the MAC is considered as the reference transmission point) and the target CFN (transmission time by L1) on the cell. Practically, the adjustment to RFN_CFN_Offset can be applied by either moving the transmission time at the RNC or moving the target CFN.

If the strategy selected is to move the transmission time on the RNC, frames arriving early at the Node B-cell implies that future frames to be transmitted will also be delayed at the RNC. This means missing potentially valuable radio frames at the Node B for data transmission and will lead to unnecessary data build-up in the RNC buffers, the potential increase of end-to-end delay, and eventually the degradation of QoS as a result of frames being dropped. For real time (RT) services, delaying data transmission leads to data buffering, which will most likely conflict with associated QoS requirements due to the stringent end-to-end delay requirements. However, if the time alignment procedure with the core network is supported, the capability to delay the data transmission time can be used to fine tune the timing adjustment. Also, for non-real time (NRT) services, the data frame could be delayed in favor of RT services.

If a frame arrives late or too late at the Node B-cell, then the data must be sent earlier. The difficulty here is that the transmission time cannot be moved backward since obviously, the elapsed time cannot be recovered. In this case, it is too late to transmit certain frames. These frames will either be dropped locally at the RNC or will be transmitted toward the Node B and will most likely be dropped at the Node B-cell side, leading to the possibility of generating cascading timing adjustment control frames.

If the strategy is to move the target CFN, then the target CFNs for future frames to be transmitted are moved forward or backward depending on whether the frames are received late or early. The drawback of this alternative is that for the scenario where the CFN is adjusted backward in order to delay data transmission, there could be an overlap of target CFNs included in a future frame with the target CFNs of frames previously sent, leading to frame collision on the cell side and resulting in frame drop. This side effect can be limited by having a tight buffer on the cell side and a good target CFN initialization with the design objective of having the data arrive just on time for transmission over the air interface. The present invention preferably applies the second strategy, to adjust the target CFN.

VIII. Basic Approach

Figure 7:
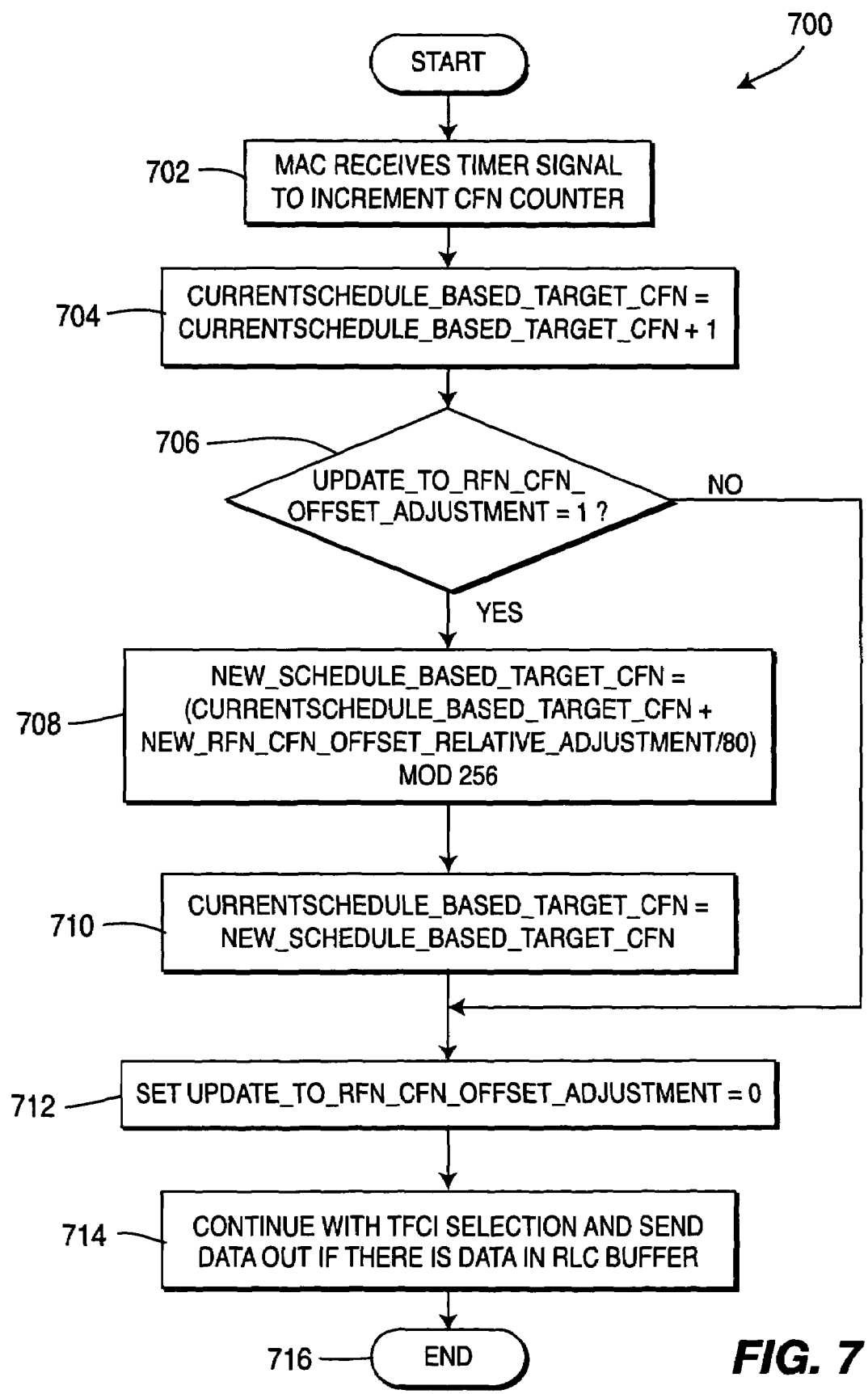
FIG. 7 is a flowchart of a method for adjusting the target CFN value in the RNC for media access control (MAC).

After computing the required update (by either the RRC or the MAC) to RFN_CFN_Offset, the MAC adjusts the target CFN for future frames to be transmitted as indicated by the method 700 shown in FIG. 7. At CFN initialization, the timer that controls the CFN counter increment is initialized and is run thereafter, providing timing ticks every 10 ms. Since the adjustment is made to the target CFN, there is no need to re-initialize the timer to a different starting point on the time axis.

The method 700 begins by the MAC receiving a timer signal to increment the CFN counter (step 702) and the CurrentSchedule_Based_Target_CFN variable is incremented by one (step 704). A determination is made whether Update_To_RFN_CFN_Offset_Adjustment is equal to one, which indicates whether a new RFN_CFN_Offset_Adjustment value has been received since the last update to RFN_CFN_Offset (step 706). If Update_To_RFN_CFN_Offset_Adjustment is one, then New_Schedule_Based_Target_CFN is calculated (step 708) as follows:

New_Schedule_Based_Target_CFN=(CurrentSchedule_Based_Target_CFN +New_RFN_CFN_Offset_Relative_Adjustment/80) mod 256   Equation (19)

CurrentSchedule_Based_Target_CFN is then set to New_Schedule_Based_Target_CFN (step 710). The variable Update_To_RFN_CFN_Offset_Adjustment is set to zero (step 712), to indicate that there has been no change to RFN_CFN_Offset since the last update. Then TFCI selection continues and data is transmitted is there is data in the RLC buffer (step 714), and the method terminates (step 716).

IX. Advanced Approach

In case of multiplexing of several users on the same transport bearer (for instance, a data frame belonging to several users sharing the same ATM virtual channel) or competing for the same processing device resources, the adjustment on one user might negatively impact other users. An advanced approach can be implemented as follows:

1. Apply the Basic Approach as described above.

2. Based on QoS characteristics (type of service and acceptable end-to-end delay) and TOA statistics, certain users' data could be delayed or advanced as a result of the adjustment made in the Basic Approach. This assumes that there is a background collection of TOA samples through periodic execution of the transport channel synchronization procedure.

3. Compute the adjustments as described in the method 600 and apply these adjustments following the method 700. In the case of NRT services, the adjustment could be applied to the transmission time instead of to the target CFN. For instance, in case of a frame arriving too early, the RNC could buffer the data and concentrate processing power and other system resources on RT services, provided that the NRT services' QoS are met.

X. Extension to Time Alignment Procedure Over RNC-Core Network Interface (Iu):

As discussed above, the RFN_CFN_Offset adjustment can either be applied to the RNC transmission time or to the target CFN. The timing of data transmission time at the RNC can be fine tuned by instructing the core network to advance the delay of the data transmission. Especially for a small RFN_CFN_Offset value (less than one radio frame for instance), the timing adjustment can be used in combination with methods described above. In the case of a frame arriving at the Node B with small TOA values, the timing alignment could exclusively be used by the RNC to instruct the core network to advance the data transmission or delay the data transmission accordingly. Delaying the data transmission in the core network implies no unnecessary buffering in UTRAN (at the RNC side or the Node B-cell side). In case of a larger TOA, adjustments to the target CFN could be made on a frame scale basis, followed by fine-tuning the adjustment using the time alignment procedure.

The time alignment procedure described in the 3GPP specifications or any similar procedure can be used to instruct the core network (GSM AMR vocoder, SMS center, etc.) to delay or advance its downlink data transmission timing.

Although the features and elements of the present invention are described in the preferred embodiments in particular combinations, each feature or element can be used alone (without the other features and elements of the preferred embodiments) or in various combinations with or without other features and elements of the present invention.

While specific embodiments of the present invention have been shown and described, many modifications and variations could be made by one skilled in the art without departing from the scope of the invention. The above description serves to illustrate and not limit the particular invention in any way.

What is claimed is:

1. A method for transmitting a data frame in a wireless communication system, comprising:
    creating a time of arrival (TOA) window allowed to extend beyond a receiving window, the TOA window including a window start (WS) and a window end (WE), the WS and WE being determined by a radio network controller;
    determining a time of arrival (TOA) of the data frame at the air interface for transmission;
    buffering the data frame in a buffer if the data frame TOA is before the WS, the size of the buffer being at least as large as the sum of the WS value plus the WE value, the sum divided by the transmission time interval value;
    transmitting the data frame if the data frame TOA is within the TOA window; and
    discarding the data frame if the data frame TOA is after the WE.

2. The method according to claim 1, wherein the buffering is performed only if a buffer is large enough to store the data frame.

3. The method according to claim 1, wherein a margin of length WE exists after the WE, such that a data frame having a TOA in the margin is transmitted.

4. The method according to claim 1, wherein determining a TOA of the data frame includes:
    obtaining a scheduled time that the data frame is supposed to be transmitted;

estimating the processing time of the data frame; and determining the data frame TOA from the equation:

$$TOA = (\text{Scheduled Time} - \text{Processing Time} - WE) - \text{Current Time}.$$

5. The method according to claim 4, wherein if the data frame has an associated system frame number (SFN), then the TOA is determined from the equation:

$$TOA = (\text{Scheduled SFN}_{time} - \text{Processing Time} - WE) - \text{Current SFN}_{time},$$

wherein the Scheduled $SFN_{time}$ is the time the SFN was originally scheduled to be transmitted and the Current $SFN_{time}$ is the time of the current SFN.

6. The method according to claim 4, wherein if the data frame has an associated connection frame number (CFN), then the TOA is determined from the equation:

$$TOA = (\text{Scheduled CFN}_{time} - \text{Processing Time} - WE) - \text{Current CFN}_{time},$$

wherein the Scheduled $CFN_{time}$ is the time the CFN was originally scheduled to be transmitted and the Current $CFN_{time}$ is the time of the current CFN.

7. The method according to claim 4, further including:
evaluating the calculated TOA value; and
adjusting the TOA value if the TOA value is outside a predetermined range.

* * * * *

UNITED STATES PATENT AND TRADEMARK OFFICE
CERTIFICATE OF CORRECTION

PATENT NO.       : 7,583,653 B2                                    Page 1 of 1
APPLICATION NO.  : 10/877310
DATED            : September 1, 2009
INVENTOR(S)      : Adjakple et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Fourteenth Day of September, 2010

David J. Kappos
*Director of the United States Patent and Trademark Office*